(12) United States Patent
Kwon et al.

(10) Patent No.: US 7,911,986 B2
(45) Date of Patent: Mar. 22, 2011

(54) APPARATUS AND METHOD FOR MEASURING BI-DIRECTIONAL RADIO CHANNEL HAVING MULTIPLE ANTENNA

(75) Inventors: Heon-Kook Kwon, Daejon (KR);
Kwang-Chun Lee, Daejon (KR);
Hyun-Kyu Chung, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 12/514,831

(22) PCT Filed: Oct. 30, 2007

(86) PCT No.: PCT/KR2007/005394
§ 371 (c)(1),
(2), (4) Date: May 14, 2009

(87) PCT Pub. No.: WO2008/060049
PCT Pub. Date: May 22, 2008

(65) Prior Publication Data
US 2010/0046386 A1 Feb. 25, 2010

(30) Foreign Application Priority Data
Nov. 14, 2006 (KR) .................. 10-2006-0112169

(51) Int. Cl.
*H04J 3/00* (2006.01)
*H04J 1/00* (2006.01)
(52) U.S. Cl. ......... 370/280; 370/281; 370/252; 375/229
(58) Field of Classification Search .................. 370/252, 370/280, 281, 319, 321, 337, 344, 347; 375/148, 375/229
See application file for complete search history.

(56) References Cited

U.S. PATENT DOCUMENTS

| 6,859,503 | B2 | 2/2005 | Pautler et al. |
| 2001/0001617 | A1* | 5/2001 | Koga et al. .................. 375/347 |

(Continued)

FOREIGN PATENT DOCUMENTS

EP 1585246 A2 10/2005

(Continued)

OTHER PUBLICATIONS

International Search Report of International Application No. PCT/KR2007/005394 filed on Oct. 30, 2007.

(Continued)

*Primary Examiner* — Andrew Lee
(74) *Attorney, Agent, or Firm* — Kile Park Goekjian Reed & McManus PLLC

(57) ABSTRACT

An apparatus and method for measuring bi-directional radio channel with multiple antenna are provided. The apparatus includes a transmitter for amplifying a signal that is frequency-up converted to radio frequency and removing a signal of other frequency band, a high power multiplexing switch for sequentially transferring transmitting signals from the transmitter to a corresponding circulator, a plurality of circulators for transferring the transmitting signals from the high power multiplexing switch to a corresponding antenna among multiple antennas, and transferring a receiving signal from a corresponding antenna, a low loss multiplexing switch for receiving the receiving signal from the corresponding circulator, and sequentially transferring the receiving signal; and a receiver for receiving the receiving signal from the low loss multiplexing switch, removing undesired frequency components from the receiving signal except a desired frequency band and low-noise amplifying the desired frequency band of the receiving signal.

7 Claims, 5 Drawing Sheets

U.S. PATENT DOCUMENTS

| | | | |
|---|---|---|---|
| 2006/0126577 A1* | 6/2006 | Yano et al. | 370/337 |
| 2007/0022460 A1* | 1/2007 | Kim et al. | 725/128 |
| 2008/0122693 A1* | 5/2008 | Needham et al. | 342/368 |
| 2008/0130526 A1* | 6/2008 | Che | 370/280 |
| 2008/0219670 A1* | 9/2008 | Kim et al. | 398/115 |
| 2008/0290962 A1* | 11/2008 | Kim et al. | 333/103 |
| 2010/0008267 A1* | 1/2010 | Moon et al. | 370/280 |

FOREIGN PATENT DOCUMENTS

| | | |
|---|---|---|
| KR | 10-2003-0085101 A | 1/2003 |
| KR | 10-2006-0023525 A | 3/2003 |
| KR | 10-0434530 B1 | 5/2004 |
| KR | 10-2005-0098413 A | 10/2005 |

OTHER PUBLICATIONS

Zhang Ming, Zhang Jianhua, Jiang Lei, Zhang Ping and Wu Yufei, 3.5GHz Broadband Propagation Measurement in Beijing, Wireless World Research Forum, Mar. 2005, WG4, pp. 1-6.

Jarmo Kivinen, Timo O. Korhonen, Pauli Aikio, Ralf Gruber and Pertti Vainikainen, Wideband Radio Channel Measurement System at 2 GHz, IEEE Transaction on Instrumentation and Measurement, Feb. 1999, vol. 48, pp. 39-44.

* cited by examiner

APPARATUS AND METHOD FOR MEASURING BI-DIRECTIONAL RADIO CHANNEL HAVING MULTIPLE ANTENNA

TECHNICAL FIELD

The present invention relates to an apparatus and method for measuring bi-directional radio channel with multiple antenna; and, more particularly, to a apparatus and method for measuring bi-directional radio channel with multiple antenna by including a transmitter and a receiver and transmitting and receiving a signal through multiple antennas and for measuring a channel characteristic identical to a communication scheme using a real radio channel with a low cost by transferring a signal to multiple antennas through single high power amplifier and a low cost high power switch.

This work was partly supported by the Information Technology (IT) research and development program of the Korean Ministry of Information and Communication (MIC) and/or the Korean Institute for Information Technology Advancement (IITA) [2005-S-001-02, "Development of Wireless Vector Channel Model for next generation mobile communication"].

BACKGROUND ART

In general, a channel measuring apparatus according to the related art is separately embodied with one of a transmitter and a receiver, for transmitting a channel measuring signal or for receiving the transmitted channel measuring signal. Therefore, the channel measuring apparatus according to the related art measures one-directional radio channel.

Since the channel measuring apparatus according to the related art is embodied with one of a transmitter and a receiver, the channel measuring apparatus having the transmitter only transmits a channel measuring signal, and the channel measuring apparatus having the receiver measures a radio channel at a predetermined location by receiving a channel measuring signal.

Therefore, the channel measuring apparatus according to the related art only measures one-directional channel characteristic unlike a bi-directional communication scheme of a mobile communication that wants to use the measured radio channel characteristics.

In a commercial mobile communication network, terminals communication with a base station by transmitting and receiving signals to/from each others. Therefore, it is required to measure not only the characteristics of a downlink channel from a base station to terminals but also the characteristics of an uplink channel from terminals to a base station.

In order to measure the bi-direction channel characteristic using the channel measuring apparatus according to the related art, the downlink characteristics and the uplink characteristics are separately measured. Therefore, it is inconvenient to measure the bi-direction channel characteristics using the channel measuring apparatus according to the related art.

In a time division duplex (TDD) scheme, an uplink and a downlink use the same frequency and have the same channel characteristics. However, the channel characteristics vary according to the channel environment and the location of a terminal, which change with time. Therefore, it is better to measure the downlink channel characteristics and the uplink channel characteristic at the same time. However, it is impossible to measure the characteristics of the uplink and the downlink at the same time.

In a frequency division duplex (FDD) scheme, the uplink and the downlink use different frequencies. Therefore, the channel measuring apparatus according to the related art has a limitation to measure the characteristics of a bi-directional radio channel.

Since the channel measuring apparatus according to the related art uses high cost high power amplifiers as many as the number of multiple antennas, the cost of embodying the channel measuring apparatus according to the related art is high.

DISCLOSURE

Technical Problem

An embodiment of the present invention is directed to providing a apparatus for measuring a bi-directional radio channel with multiple antenna by including a transmitter and a receiver and transmitting and receiving a signal through multiple antennas and for measuring a channel characteristic identical to a communication scheme using a real radio channel by transferring a signal to multiple antennas through single high power amplifier and a low cost high power switch.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for measuring bi-directional radio channel in a time division duplex (TDD), including: a transmitter for amplifying a signal that is frequency-up converted to radio frequency and removing a signal of other frequency band; a high power multiplexing switch for sequentially transferring transmitting signals from the transmitter to a corresponding circulator; a plurality of circulators for transferring the transmitting signals from the high power multiplexing switch to a corresponding antenna among multiple antennas, and transferring a receiving signal from a corresponding antenna; a low loss multiplexing switch for receiving the receiving signal from the corresponding circulator, and sequentially transferring the receiving signal; and a receiver for receiving the receiving signal from the low loss multiplexing switch, removing undesired frequency components from the receiving signal except a desired frequency band and low-noise amplifying the desired frequency band of the receiving signal.

In accordance with another aspect of the present invention, there is provided an apparatus for measuring a bi-directional channel in a frequency division duplex (FDD), including: a transmitter for amplifying a signal that is frequency-up converted to a radio frequency and removing a signal of other frequency band; a high power multiplexing switch for transferring a transmitting signal from the transmitter to a corresponding duplexer; a plurality of duplexers for transferring the transmitting signal from the high power multiplexing switch to a corresponding antenna among multiple antennas and transferring a receiving signal of a corresponding antenna; a low loss multiplexing switch for sequentially transferring the receiving signal through the duplexer; and a receiver for receiving the receiving signal from the low loss multiplexing switch, removing undesired frequency components from the receiving signal except a desired frequency band and low-noise amplifying the desired frequency band of the receiving signal.

Advantageous Effects

A channel measuring apparatus according to an embodiment of the present invention can measure bi-directional channel by including both of a transmitter and a receiver and transmitting and receiving signals through multiple antennas and can measure channel characteristics identical to a communication scheme using a real radio channel with a low cost by transferring a signal to multiple antennas through single high power amplifier and a low cost high power switch.

Also, the channel measuring apparatus according to an embodiment of the present invention can measure uplink and downlink channel characteristics at the same time in commercial mobile communication environment where communications are performed bi-directionally. Therefore, the channel measuring apparatus according to an embodiment of the present invention reduces a time of measure uplink and downlink characteristics by half, which was taken by a channel measuring apparatus according to the related art that separately measures the uplink and the downlink characteristics. Also, the channel measuring apparatus according to an embodiment of the present invention requires less cost to embody. Furthermore, the channel measuring apparatus according to an embodiment of the present invention is reduced in a size and a weight.

The channel measuring apparatus according to an embodiment of the present invention measures the bi-directional channel at the same time, thereby effectively measuring uplink and downlink channels.

BEST MODE FOR THE INVENTION

The advantages, features and aspects of the invention will become apparent from the following description of the embodiments with reference to the accompanying drawings, which is set forth hereinafter.

Figure 1:
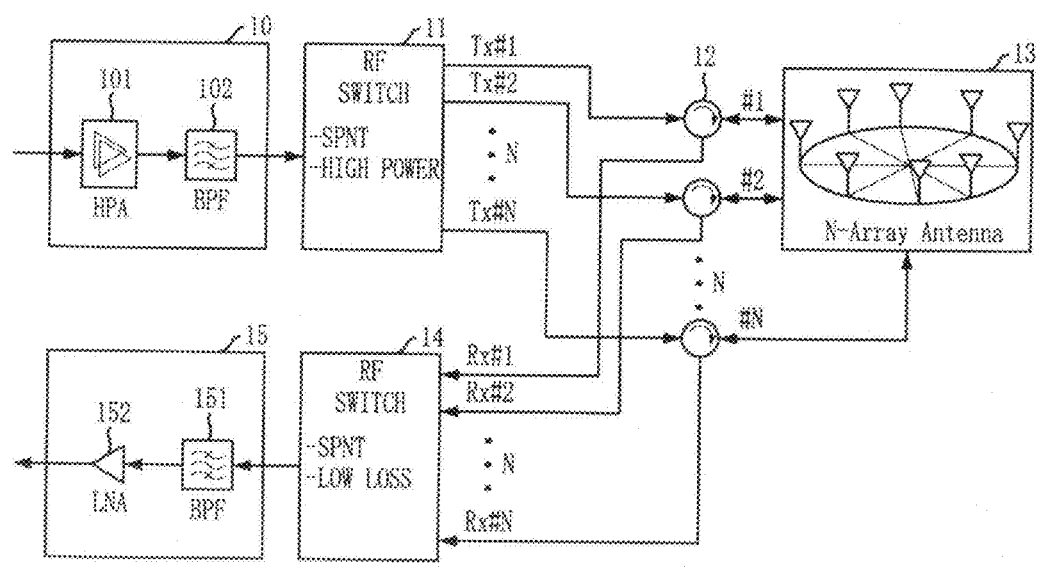
FIG. 1 is a block diagram illustrating an apparatus for measuring bi-directional radio channel using multiple antennas in accordance with an embodiment of the present invention.

FIG. 1 is a block diagram illustrating an apparatus for measuring bi-directional radio channel using multiple antennas in accordance with an embodiment of the present invention. That is, FIG. 1 shows a channel measuring apparatus for time division duplex (TDD).

As shown in FIG. 1, the apparatus for measuring a bi-directional radio channel using multiple antenna according to the present embodiment includes a transmitter 10, a high power multiplexing switch 11, a plurality of circulators 12, a multiple antenna 13, a low loss multiplexing switch 14, and a receiver 15. The transmitter 10 amplifies a transmitting signal that is frequency-up converted to radio frequency (RF) and removes a signal of other frequency band except the amplified transmitting signal. The high power multiplexing switch 11 sequentially transfers the transmitting signal from the transmitter 10 to corresponding circulators 12. A plurality of the circulators 12 transfer a transmitting signal to a corresponding antenna and transfers a received signal from a corresponding antenna to the low loss multiplexing switch 14. The low loss multiplexing switch 14 sequentially receives the receiving signal through the circulators 12 and sequentially transfers the received signal to the receiver 15. The receiver 15 removes undesired frequency components from the received signal except target frequency bands and low-noise amplifies the received signal.

The transmitter 10 includes a high power amplifier 101 for amplifying a transmitting signal which is frequency-up converted to a radio frequency and a band-pass filter 102 for removing a signal of other frequency band except the amplified transmitting signal.

The receiver 15 includes a band-pass filter 151 for removing the frequency components of undesired radio channels from a signal received through the low loss multiplexing switch 14 except a desired frequency band and a low noise amplifier for low-noise amplifying the received signal from the band-pass filter 151.

The circulators 12 divide transmitting and receiving signal according to time division duplex (TDD) in order to use the same antenna for the transmitting and receiving signal in the TDD based channel measuring apparatus according to the present embodiment.

Figure 3:
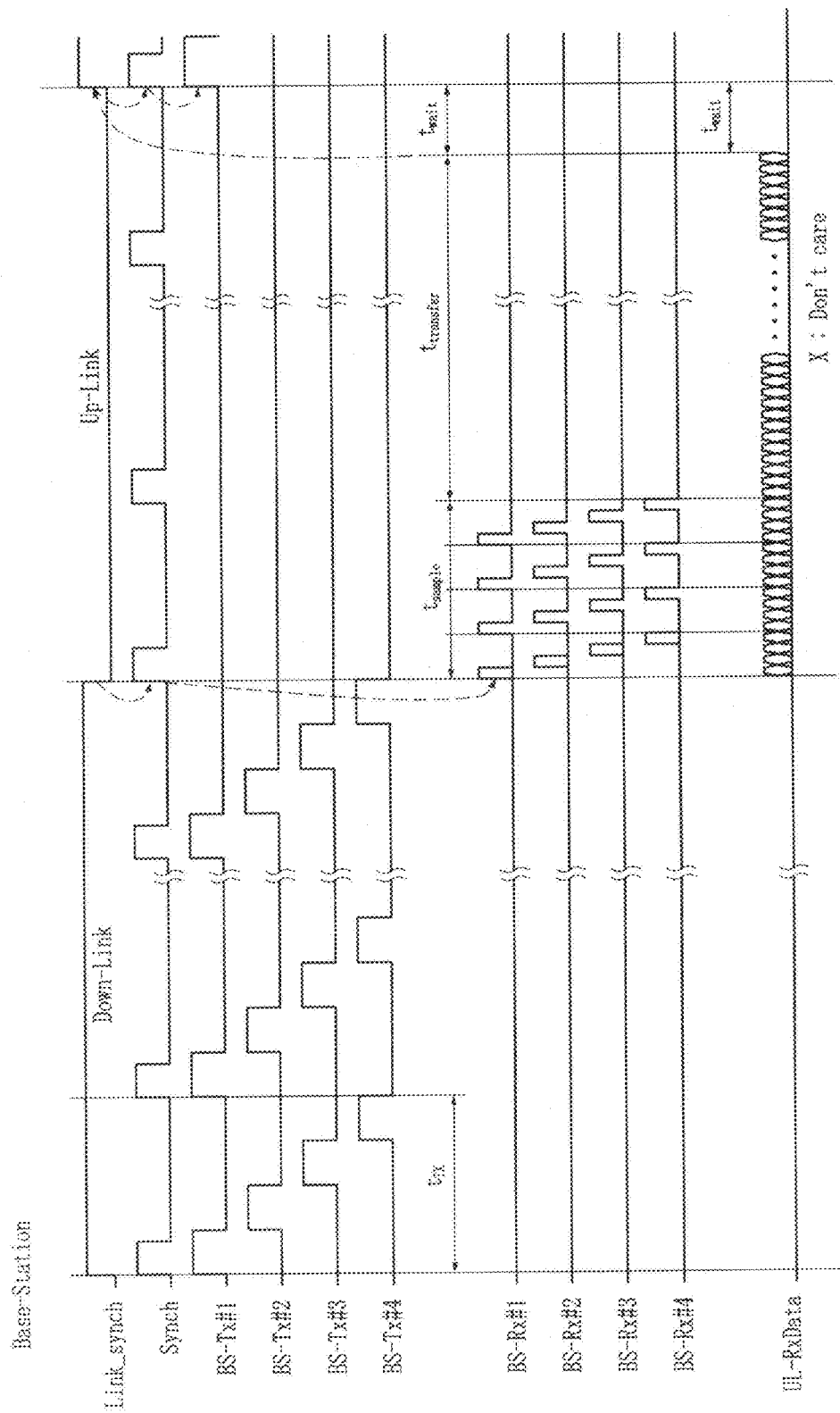
FIGS. 3 and 4 are transmitting and receiving timing diagrams for measuring a bi-directional channel used in a channel measuring apparatus using time division duplex (TDD) in accordance with an embodiment of the present invention.
Figure 4:
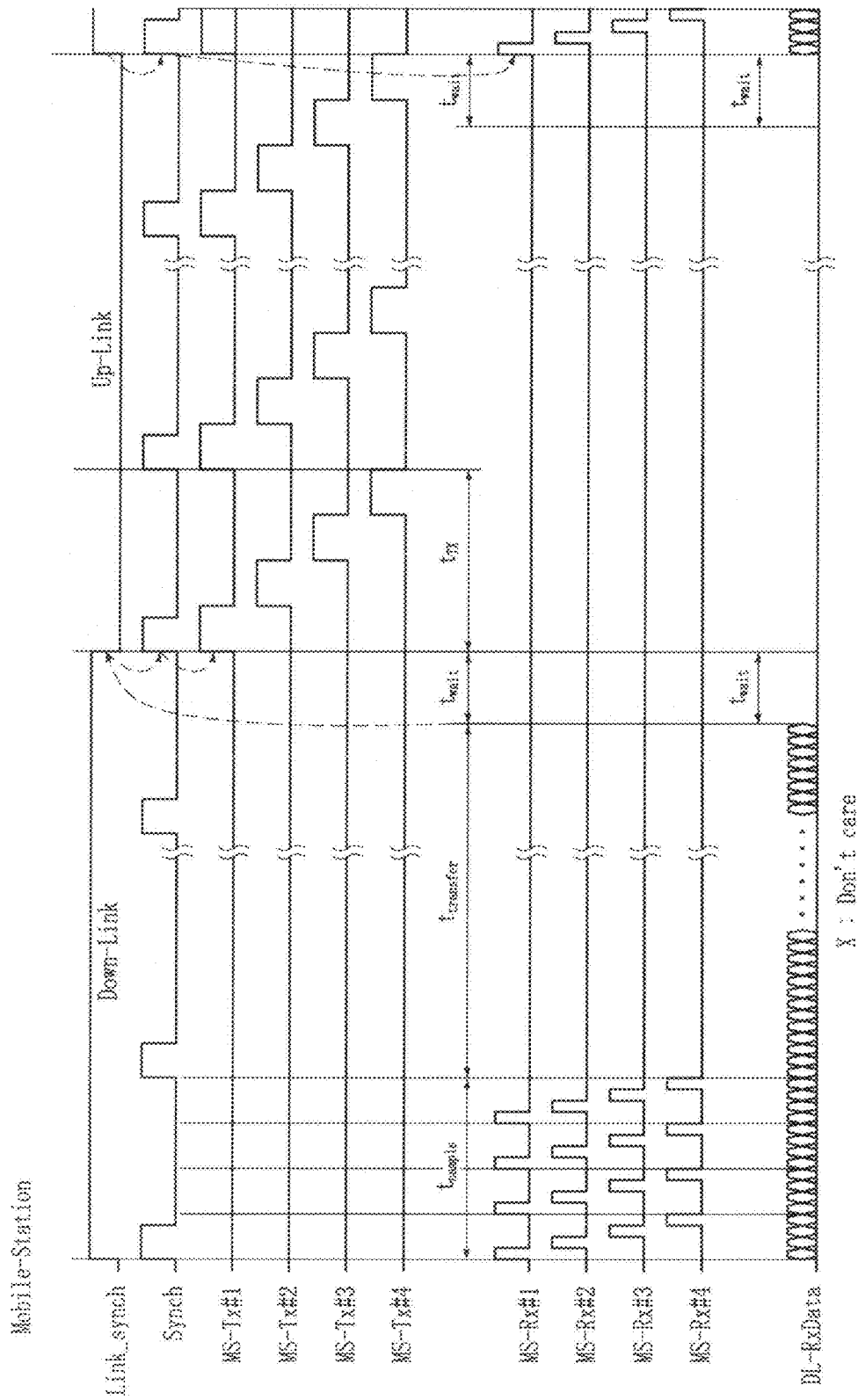

The TDD based channel measuring apparatus according to the present invention measures bi-directional radio channel using a transmitting timing diagram and a receiving timing diagram shown in FIGS. 3 and 4.

When the downlink radio channel is measured, it is important to turn off all of paths for measuring uplink channel measurement.

That is, in order to prevent the transmitting signal from being exited to the receiver due to the isolation limitation of the circulator 12, the paths of the low loss multiplexing switch 14 for the transmitting signal must be turned off.

Therefore, additional transmitting/receiving isolation degrees can be obtained as many as the isolation degrees of the low loss multiplexing switch 14.

A signal transmitted from one transmitting antenna is sequentially received at multiple receiving antennas. After the multiple transmitting antennas perform all of the operations described above, the multiple antenna performs the above operation in reverse in order to measure opposite direction channel. By repeatedly performing the operations described above, the bi-directional radio channel is measured at low coat based on TDD.

Figure 2:
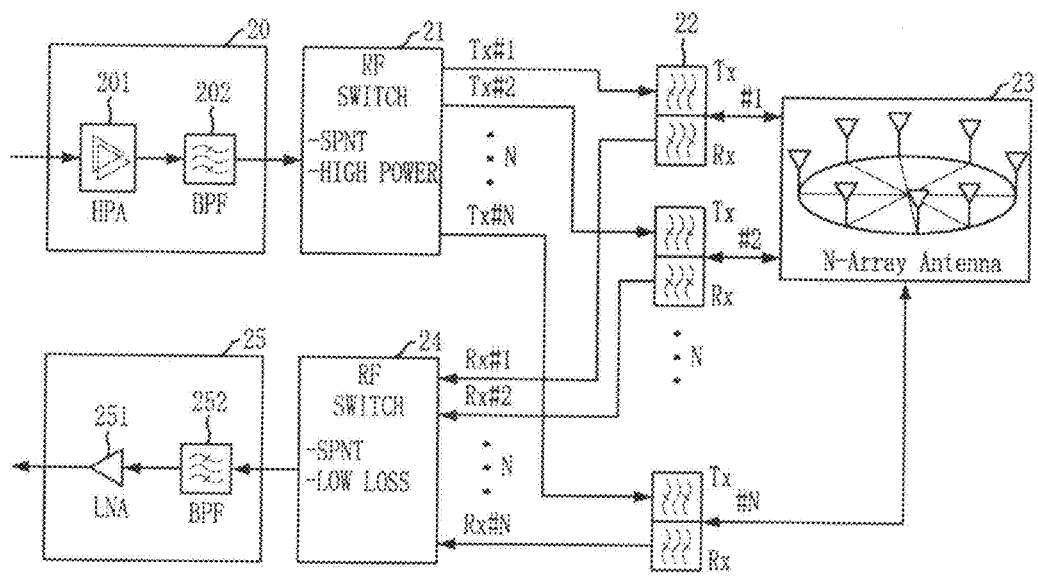
FIG. 2 is a block diagram depicting an apparatus for measuring bi-directional radio channel using multiple antennas in accordance with another embodiment of the present invention.

FIG. 2 is a block diagram depicting an apparatus for measuring bi-directional radio channel using multiple antennas in accordance with another embodiment of the present invention. That is, the FIG. 2 shows a channel measuring apparatus for frequency division duplex (FDD).

As shown in FIG. 2, the apparatus for measuring bi-directional radio channel includes a transmitter 20, a high power multiplexing switch 21, a plurality of duplexers 22, a low loss multiplexing switch 24, and a receiver 25. The transmitter 20 amplifies a signal which is frequency-up converted to a radio frequency and removes undesired frequency bands from the amplified signal. The high power multiplexing switch 21 sequentially transfers the transmitting signal of the transmitter 20 to a corresponding duplexer 22. A plurality of the duplexers 22 transfer the transmitting signal from the high power multiplexing switch 21 to a corresponding antenna of the multiple antennas 23. The low loss multiplexing switch 24 sequentially transfers received signals from the duplexers 22 to the receiver 25. The receiver 25 removes the frequency components of undesired radio channel from the received signal except the desired frequency band and low-noise amplifies the received signal.

The transmitter 20 includes a high power amplifier 201 for amplifying the transmitting signal which is frequency-up converted to a radio frequency and a band-pass filter 202 for removing undesired frequency band signal except the amplified transmitting signal from the high power amplifier 201.

The receiver 25 includes a band-pass filter 251 for removing the frequency components of undesired radio channel from the received signal from the low loss multiplexing switch 24 except desired frequency band, and a low noise amplifier 252 for low-noise amplifying the received signal from the band-pass filter 251.

The duplexer 22 divides transmitting and receiving signals according to the frequency division duplex. Since the transmitting frequency is different from the receiving frequency, the transmitting signal is excited to the receiver 25 as much as the attenuation in the receiving frequency band of the transmitter 20. But the excited amount of the transmitting signal is very small.

Figure 5:
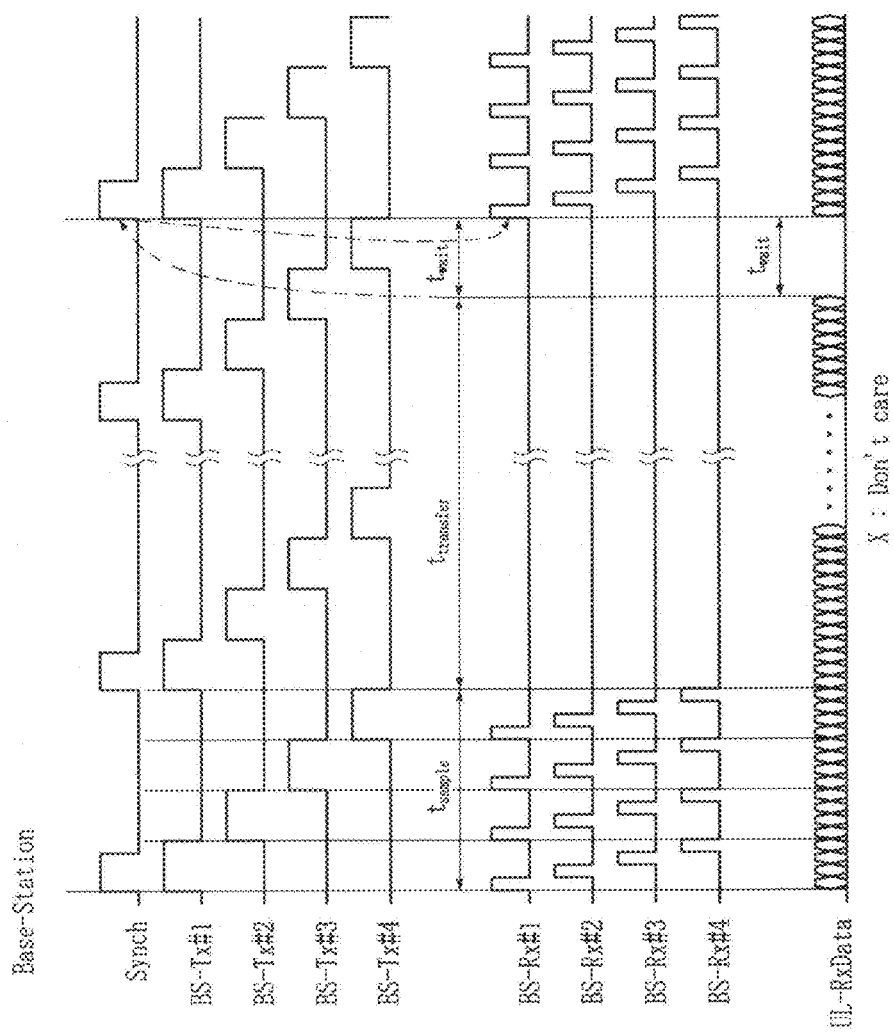
FIGS. 5 and 6 are transmitting and receiving timing diagrams for measuring a bi-directional channel in a channel measuring apparatus using frequency division duplex (FDD) in accordance with an embodiment of the present invention.
Figure 6:
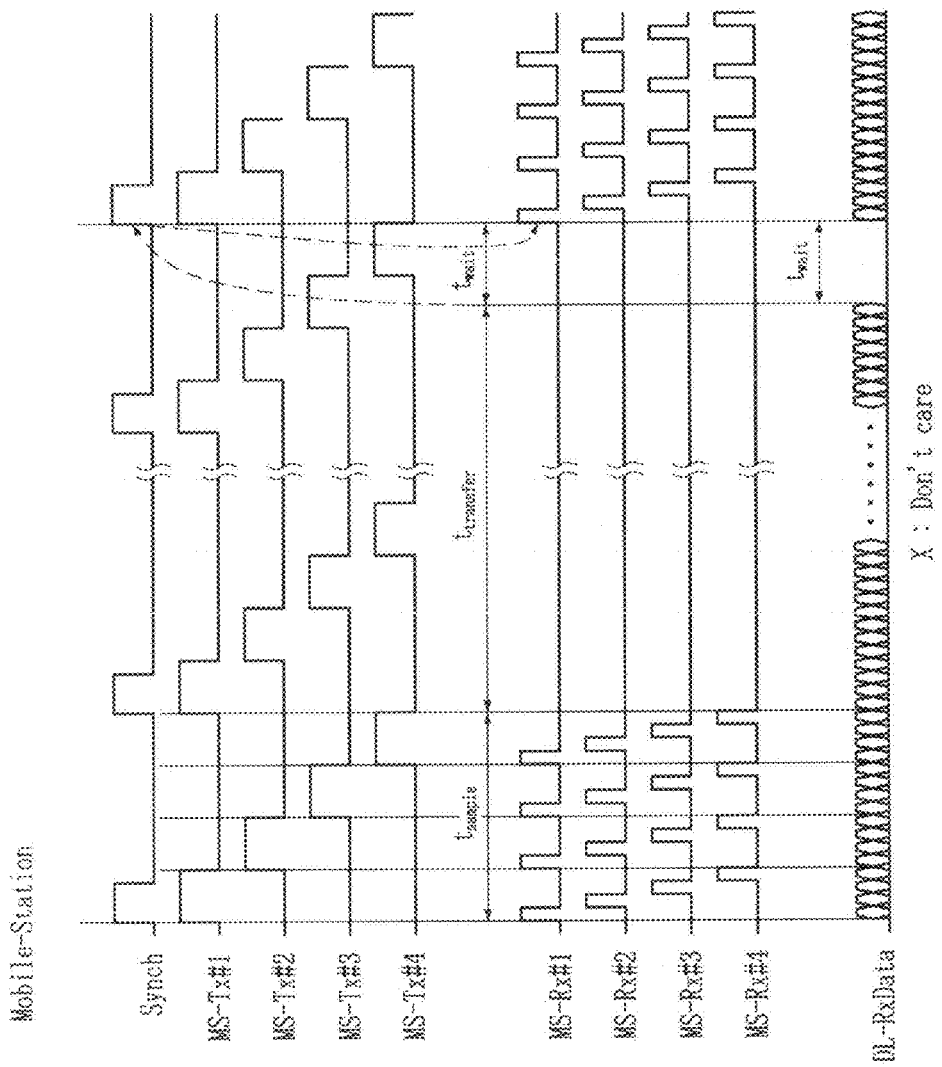

The FDD based channel measuring apparatus according to the present embodiment follows the transmitting and receiving timing diagrams shown in FIGS. 5 and 6 for measuring bi-direction radio frequency channel.

The transmitting and receiving timing diagrams for the FDD based channel measuring apparatus according to the present embodiment are comparatively simpler than those for the TDD channel measuring apparatus. The FDD channel measuring apparatus according to the present embodiment measures bi-directional radio channels with different frequencies by transmitting and receiving through the duplexers 22.

As described above, the channel measuring apparatus according to the present embodiment uses one high power amplifier and a low cost high power switch without using the high cost high power amplifiers as many as the number of antennas.

The operations performed based on the transmitting and receiving timing diagrams are identical in TDD and FDD.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

What is claimed is:

1. An apparatus for measuring bi-directional radio channel in a time division duplex (TDD), comprising:
   a transmitting means for amplifying a signal that is frequency-up converted to radio frequency and removing a signal of other frequency band;
   a high power multiplexing switching means for sequentially transferring transmitting signals from the transmitting means to a corresponding circulator;
   a plurality of circulators for transferring the transmitting signals from the high power multiplexing switching means to a corresponding antenna among multiple antennas, and transferring a receiving signal from a corresponding antenna;
   a low loss multiplexing switching means for receiving the receiving signal from the corresponding circulator, and sequentially transferring the receiving signal; and
   a receiving means for receiving the receiving signal from the low loss multiplexing switching means, removing undesired frequency components from the receiving signal except a desired frequency band and low-noise amplifying the desired frequency band of the receiving signal.

2. The apparatus of claim 1, wherein the transmitting means includes a high power amplifier for amplifying a transmitting signal that is frequency-up converted to a radio frequency; and
   a band-pass filter for removing a signal of other frequency band except the amplified transmitting signal from the high power amplifier.

3. The apparatus of claim 2, wherein the receiving means includes:
   a band-pass filter for removing undesired frequency components from the receiving signal transferred from the low loss multiplexing switching means except a desired frequency band; and
   a low-noise amplifier for low-noise amplifying the desired frequency band of the receiving signal from the band-pass filter.

4. The apparatus of claim 1, wherein the low loss multiplexing switching means is switched off at a transmitting operation and the high power multiplexing switching means is switched off at a receiving operation in order to increase isolation between the transmitting operation and the receiving operation.

5. An apparatus for measuring a bi-directional channel in a frequency division duplex (FDD), comprising:
   a transmitting means for amplifying a signal that is frequency-up converted to a radio frequency and removing a signal of other frequency band;
   a high power multiplexing switching means for transferring a transmitting signal from the transmitting means to a corresponding duplexer;
   a plurality of duplexers for transferring the transmitting signal from the high power multiplexing switching means to a corresponding antenna among multiple antennas and transferring a receiving signal of a corresponding antenna;
   a low loss multiplexing switching means for sequentially transferring the receiving signal through the duplexer; and
   a receiving means for receiving the receiving signal from the low loss multiplexing switching means, removing undesired frequency components from the receiving signal except a desired frequency band and low-noise amplifying the desired frequency band of the receiving signal.

6. The apparatus of claim 5, wherein the transmitting means includes a high power amplifier for amplifying a transmitting signal that is frequency-up converted to a radio frequency; and
   a band-pass filter for removing a signal of other frequency band except the amplified transmitting signal from the high power amplifier.

7. The apparatus of claim 6, wherein the receiving means includes:
   a band-pass filter for removing undesired frequency components from the receiving signal transferred from the low loss multiplexing switching means except a desired frequency band; and
   a low-noise amplifier for low-noise amplifying the desired frequency band of the receiving signal from the band-pass filter.

* * * * *